Figure 1:
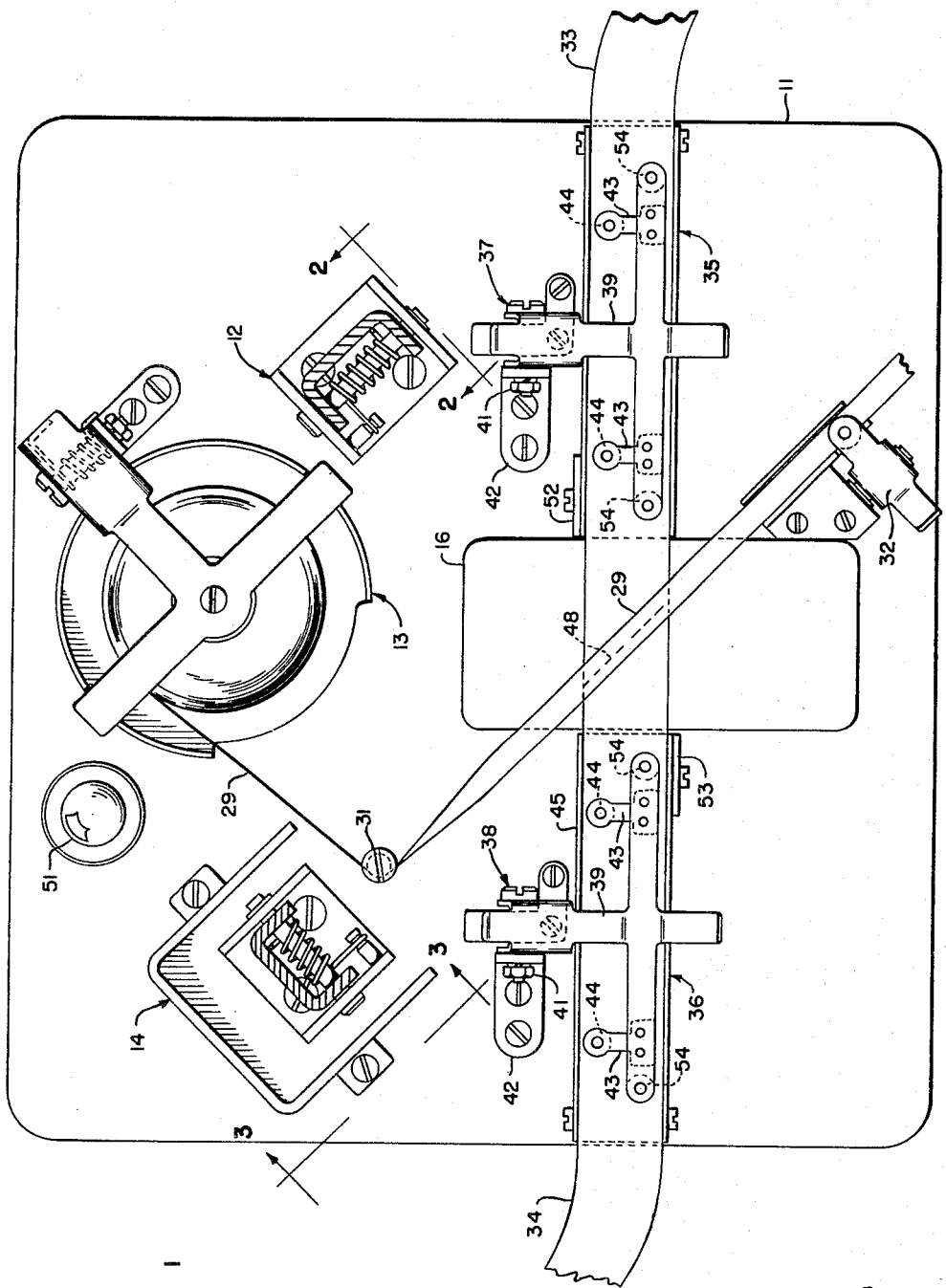

INVENTORS
HORACE S. GREAR
NATHANIEL G. KAMEN
BY
R.C. Terry
ATTORNEY

Sept. 5, 1961     H. S. GREAR ET AL     2,998,843
TAPE CLAMPING DEVICE
Filed July 14, 1958     2 Sheets-Sheet 2
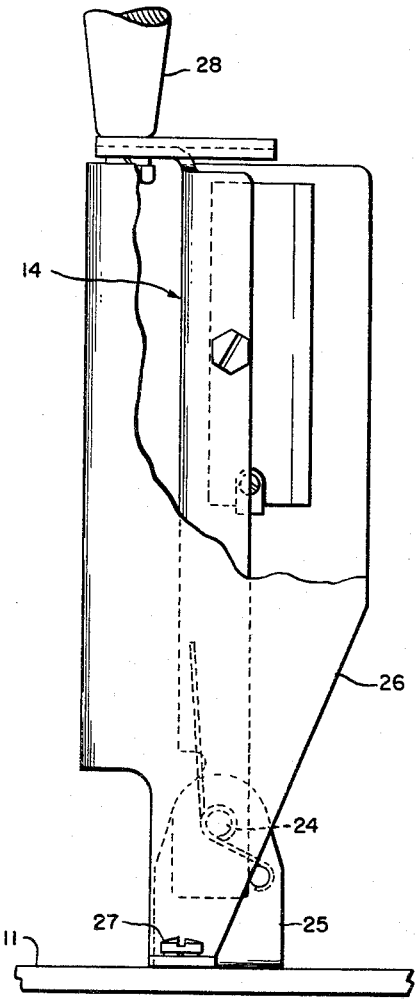
FIG. 3
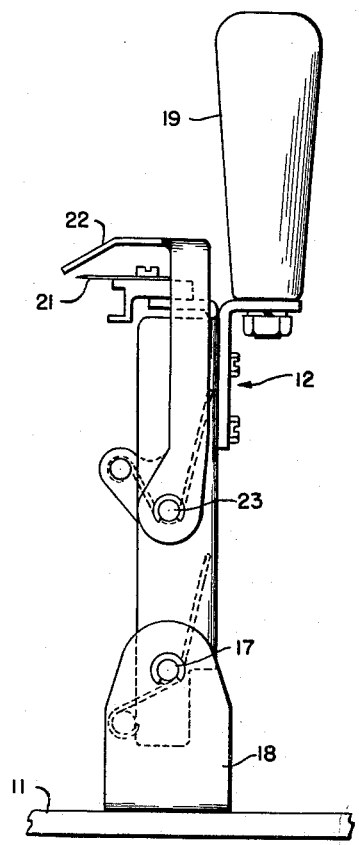
FIG. 2
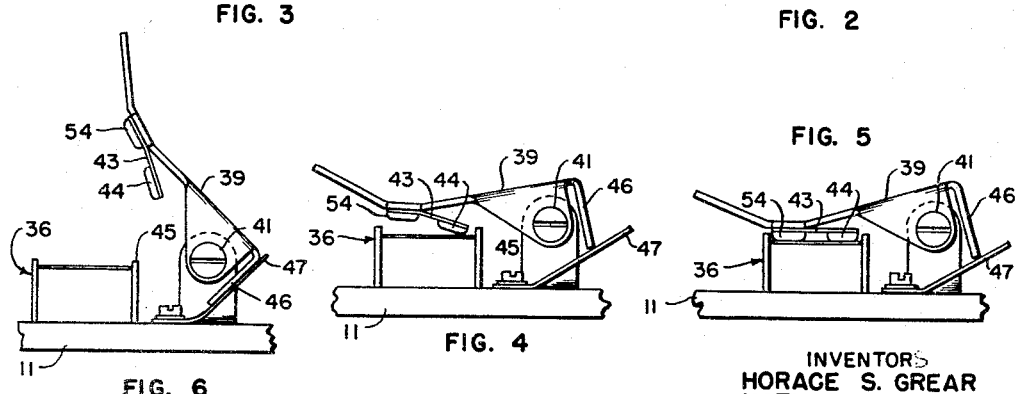
FIG. 5
FIG. 6     FIG. 4
INVENTORS
HORACE S. GREAR
BY NATHANIEL G. KAMEN
R.C. Terry
ATTORNEY United States Patent Office 2,998,843
Patented Sept. 5, 1961

2,998,843
TAPE CLAMPING DEVICE
Horace S. Grear, Mount Prospect, and Nathaniel G. Kamen, Chicago, Ill., assignors to Teletype Corporation, Chicago, Ill., a corporation of Delaware
Filed July 14, 1958, Ser. No. 748,527
3 Claims. (Cl. 154—42.3)

This invention relates to tape splicers and more particularly to tape clamping devices therefor.

The principal object of the invention is to provide a tape clamping device having facilities for insuring the proper alignment of the tape sections to be spliced.

Another object of the invention is to provide a clamping device having clamping instrumentalities adapted to align the edges of the sections of the tape.

Specifically, in the tape splicer according to the present invention, the two tape ends are overlapped and a lever carrying a razor-like blade is pulled down to cut the overlapped tapes diagonally, leaving the ends butted against each other. Then a strip of heat-submissive adhesive material is placed over the butt joint, and a strip of tissue backing is placed over this. By means of another lever, a heater is then brought down over the joint, cementing the tissue to the tape and thus splicing the two pieces of tape together. In this tape splicer, a novel tape clamping means is provided, wherein rubber, or other yieldable and clinging-type, pads thereon are effective in a manner such that the rubber pads, attached to flat springs, strike the surface of the tape and, upon further pressure being applied upon lowering the clamp upon the tape, slide the tape against the guide wall, thus assuring the alignment of the two tape sections to be spliced.

The foregoing objects and features of the invention will be more apparent in the following detailed description of the invention when taken in conjunction with the accompanying drawings, wherein:

FIG. 1 is a plan view, partly in section, of the tape splicer according to the present invention;
FIG. 2 is a view taken on line 2—2 of Fig. 1;
Fig. 3 is a view taken on line 3—3 of FIG. 1;
FIG. 4 is a view showing the clamping device in one condition of operation;
FIG. 5 is a view showing the clamping device in its fully clamped position, and
FIG. 6 is a view showing the clamping device in its fully open position.

Having reference to FIG. 1 of the drawings, the tape splicer with which the clamping device according to the present invention is employed will be described briefly. The tape splicer comprises a base portion 11 on which are mounted the tape cutting unit 12, the roll support 13 for heat-submissive adhesive material 29, and the heating unit 14. The tape guides 35 and 36 are suitably positioned with respect to the operating loci of the units 12 and 14, the flat plate 16 serving as the operating table.

Referring to FIG. 2, the cutting unit 12 is mounted pivotally at 17 on the bracket 18 secured to the base 11. The cutting unit 12 is manipulated by the handle 19 to rotate the unit 12 downwardly to bring the cutting blade 21 against the table 16. A spring loaded cutter guard 22 is pivotally mounted at 23 on the unit 12. Having reference to FIG. 3, the heating unit 14 is shown pivotally mounted at 24 to a bracket 25 secured to the base 11. A suitable shield 26 is provided around the unit 14, said shield being secured to the base 11 by screws 27. The heating unit 14 is manipulated by a handle 28 to rotate the unit 14 downwardly against the table 16.

The heat sensitive strip 29 from the roll support 13 is directed around the post 31 and across the table 16, substantially in line with the cutting angle of the tape, to a clamp 32. The tape sections 33 and 34 are guided in guideways 35 and 36, respectively, and are held in place prior to splicing by a pair of clamping devices 37 and 38. Each clamping device 37 and 38 comprises a clamping member 39 (FIGS. 1, 4, 5 and 6) mounted pivotally at 41 on a bracket 42 secured to the base 11.

Riveted to wing portions of clamping members 39 are flat spring members 43. Each member 43 carries thereon a pad 44 of rubber or other yieldable or clinging-type material. Said spring members 43 are arranged so as to be directed toward the center line of the pivot 41 and deflected from a radial line therewith in a manner such that as the tape clamp 39 is lowered, that is, rotated counterclockwise about its pivot 41 (FIGS. 4, 5 and 6), the pads 44 attached to the flat springs 43 strike the surface of the tape, as shown in FIG. 4, with a gripping action during the final downward movement of the clamp 39 and said pads 44 will slide the tape toward the rear of the guideway 36 against the tape guide wall 45. The clamps 39 with the aid of this spring-and-pad device comprising the pads 44 carried on the spring members 43, thereby assure the alignment of the two tape sections 33 and 34 to be spliced. Also secured adjacent the tips of the wings of said clamping members 39 are pads 54 confronting the tape guides 35 and 36, and acting to secure the tape sections 33 and 34 in clamped position. Each clamp member 39 is provided with a tail portion 46 adapted to cooperate with a flat spring member 47 in such a manner that the clamp member 39 can be detented in either its open position, shown in FIG. 6, or its closed position, shown in FIG. 5.

In the practice of the invention, the tape sections 33 and 34 are placed in the tape guideways 35 and 36 while the clamping devices 37 and 38 are in the open position shown in FIG. 6. The tape sections 33 and 34 are overlapped at the line 48 sufficiently to embrace a splice of the extent of the diagonal line 48. The clamping devices 35 and 36 are lowered to the position shown in FIG. 4, and upon the final movement thereof in lowering the clamp upon the tape to the position shown in FIG. 5, the pads 44 of the spring-and-pad device act to urge the tape sections 33 and 34 into edgewise contact with the inside surface of the wall 45 of the guideways, thereby assuring proper alignment of the tape sections 33 and 34. Thus, in response to the toggle effect produced in said spring-and-pad device by the lowering of the clamping devices upon said tape, the alignment of said tape is facilitated.

Then, the tape cutting unit 12 is swung downwardly to cause the blade 21 to cut the tape sections 33 and 34 along the diagonal line 48 and the excess pieces of the tape are removed, leaving the abutting edges of the tape sections exposed. The unit 12 is then returned to its vertical position, and the heat sensitive tape 29 is placed over the abutting edges of the tape and clamped by the clamping device 32. The heating unit 14 is then lowered and pressed firmly on the area to be spliced and held down until the heating-time, indicated by lamp 51, has elapsed (approximately 10 or 15 seconds).

The heat sensitive adhesive is unclamped and loosened from the cutting block or table 16, and the tape clamps 35 and 36 are raised. Holding the tape between the guide walls of the guideways 35 and 36, and pressing downward lightly, the tape splice is moved first to the right, past the right cutting blade 52 to trim the rear edge of the tape, and then to the left, past the left cutting blade 53, to cut off the excess heat sensitive adhesive at the front edge of the tape.

While the invention has been described in detail with respect to a particular application thereof, it will be understood that modifications and variations may be

What is claimed is:

1. Apparatus for aligning a section of tape comprising a tape support, a tape guide mounted on said support, a lever pivotally mounted for movement from a normal position to a position overlying said tape support, a cantilever spring secured to said lever and having its free end extending obliquely from said lever to approach contact with said tape before said lever is pivoted into the position overlying said tape support, and a friction pad secured to said free end of said cantilever spring for frictionally engaging said tape to move it laterally to abut said tape guide when said lever is pivoted toward said tape support.

2. Apparatus for aligning a section of the tape comprising a tape support, a tape guide mounted on said support, a lever pivotally mounted for rotation from a normal position to a position overlying said tape support, cantilever springs secured to said lever and having their free ends extending obliquely from said lever to approach contact with said tape before said lever is pivoted into position overlying said tape support, a first set of friction pads secured to said free ends of said cantilever springs for frictionally engaging said tape to move it laterally to abut said tape guide when said lever is pivoted toward said tape support, and a second set of friction pads secured to said lever and movable into engagement with said tape to lock said tape against movement when said lever has been pivoted to the position overlying said tape support.

3. Apparatus for aligning a section of tape comprising a tape support, a tape guide mounted on said support, a lever pivotally mounted for movement from a normal position to a position overlying said tape support, cantilever springs secured to said lever and having their free ends extending obliquely from said lever to approach contact with said tape before said lever is pivoted into the position overlying said tape support, a first set of friction pads secured to said free ends of said cantilever springs for frictionally engaging said tape to move it laterally into alignment with said tape guide when said lever is pivoted toward said tape support, a second set of friction pads secured to said lever and longitudinally and laterally spaced from said first friction pads for movement into engagement with said tape to clamp said tape against movement when said lever has been moved into a position overlying said tape guide.

References Cited in the file of this patent

UNITED STATES PATENTS

| | | |
|---|---|---|
| 748,476 | Bryce | Dec. 29, 1903 |
| 1,056,453 | Roberts | Mar. 18, 1913 |
| 2,302,561 | Libby et al. | Nov. 17, 1942 |
| 2,789,620 | Vano | Apr. 23, 1957 |
| 2,940,507 | Butler | June 14, 1960 |